United States Patent
Veiga (10) Patent No.: US 6,734,125 B2
(45) Date of Patent: May 11, 2004

(54) LAMINATED MULTI-DENIER MIXED FABRICS FOR USE IN INFLATABLE VEHICLE RESTRAINT SYSTEMS

(75) Inventor: Manuel J. Veiga, Tewksbury, MA (US)

(73) Assignee: Bradford Industries, Inc., Lowell, MA (US)

(*) Notice: Subject to any disclaimer, the term of this patent is extended or adjusted under 35 U.S.C. 154(b) by 0 days.

(21) Appl. No.: 10/232,210

(22) Filed: Aug. 30, 2002

(65) Prior Publication Data

US 2003/0060104 A1 Mar. 27, 2003

Related U.S. Application Data

(63) Continuation-in-part of application No. 10/038,207, filed on Jan. 4, 2002, and a continuation-in-part of application No. 09/956,640, filed on Sep. 19, 2001, and a continuation-in-part of application No. 09/956,639, filed on Sep. 19, 2001, which is a continuation-in-part of application No. 09/921,979, filed on Aug. 3, 2001, and a continuation-in-part of application No. 09/493,628, filed on Jan. 28, 2000, now Pat. No. 6,458,724, and a continuation-in-part of application No. 09/389,711, filed on Sep. 3, 1999, now Pat. No. 6,455,449, and a continuation-in-part of application No. 09/327,245, filed on Jun. 7, 1999, now abandoned, and a continuation-in-part of application No. 09/327,244, filed on Jun. 7, 1999, now abandoned, which is a continuation-in-part of application No. 09/327,243, filed on Jun. 7, 1999, now Pat. No. 6,239,046.

(60) Provisional application No. 60/293,613, filed on May 25, 2001.

(51) Int. Cl.$^7$ .................................................. D03D 13/00
(52) U.S. Cl. ................. 442/203; 139/408; 139/409; 139/410; 139/411; 139/412; 139/413; 139/414; 139/415; 139/416; 139/417; 139/418; 139/419; 139/420 R; 139/421; 139/422; 139/423; 139/384 R; 139/387 R; 442/76; 442/103; 442/104; 442/108; 442/164; 442/168; 442/181; 442/182; 442/183; 442/189; 442/206; 442/207; 442/208; 442/218; 442/286

(58) Field of Search .................... 3/383; 139/384 R, 139/387 R, 408–419, 420 R, 421–423, 389; 280/728.1, 729, 733, 748.1; 106/287.13, 287.14, 287.16; 428/34.1, 34.3, 34.6, 35.2, 35.7, 35.9, 36.91, 101, 166, 36.1; 442/76, 164, 168, 169, 182, 183, 189, 203–208, 218

(56) References Cited

U.S. PATENT DOCUMENTS 3,970,328 A 7/1976 Wallsten (List continued on next page.)

FOREIGN PATENT DOCUMENTS

WO    WO 00/78578 A1    12/2000

OTHER PUBLICATIONS

Publication of Clark–Schwebel Joint Ventures, C–S Integlas A.G., title page, Clark–Schwebel description page, contents, disclaimer page.
Parameters for Woven Fabric Selection (2 pages).

Primary Examiner—Arti R. Singh
(74) Attorney, Agent, or Firm—Hollander Law Fim, P.L.C.

(57) ABSTRACT

A woven textile fabric is disclosed which is formed of synthetic yarns of at least two different deniers to which a solid polymeric film is laminated. An adhesive polymeric coating is provided for adhering the solid polymeric film to the woven textile fabric. The combination of yarns of different deniers provides a superior adhesion surface for the polymeric film. The yarns and the polymeric coating are preselected respectively in deniers and thicknesses so as to render the fabric substantially impermeable to fluid under pressure, while maintaining superb packageability and anti-blocking properties for use in vehicle occupant restraint systems. An air bag incorporating the woven textile fabric of the invention and having two outer surfaces and pre-configured air holding cavities woven therein to which a solid polymeric film is bonded for receiving and containing fluid under pressure for use in a vehicle air restraint system is also disclosed. Air vents are provided for preventing entrapped air from forming bubbles in the lamination process.

40 Claims, 6 Drawing Sheets

U.S. PATENT DOCUMENTS

| | | |
|---|---|---|
| 4,143,197 A | 3/1979 | Jasionowicz et al. |
| 4,284,682 A | 8/1981 | Frosch et al. |
| 4,560,611 A | 12/1985 | Naka et al. |
| 5,110,666 A | 5/1992 | Menzel et al. |
| 5,178,938 A | 1/1993 | Magistro et al. |
| 5,226,671 A | 7/1993 | Hill |
| 5,240,765 A | 8/1993 | Takahashi et al. |
| 5,254,621 A | 10/1993 | Inoue et al. |
| 5,258,211 A | 11/1993 | Momii et al. |
| 5,298,317 A | 3/1994 | Takahashi et al. |
| 5,316,336 A | 5/1994 | Taguchi et al. |
| 5,399,402 A | 3/1995 | Inoue et al. |
| 5,514,431 A | 5/1996 | Shimomura |
| 5,529,837 A | 6/1996 | Fujiki et al. |
| 5,630,620 A | 5/1997 | Hirai et al. |
| 5,632,057 A | 5/1997 | Lyden |
| 5,647,079 A | 7/1997 | Hakamiun et al. |
| 5,650,207 A | 7/1997 | Crouch |
| 5,651,395 A | 7/1997 | Graham et al. |
| 5,704,402 A | 1/1998 | Bowen et al. |
| 5,707,711 A | 1/1998 | Kitamura |
| 5,721,046 A | 2/1998 | Shrewsburg et al. |
| 5,845,935 A | 12/1998 | Enders et al. |
| 5,863,644 A | 1/1999 | Böonigk et al. |
| 5,881,776 A | 3/1999 | Beasley, Jr. |
| 5,906,391 A | 5/1999 | Weir et al. |
| 5,921,287 A | 7/1999 | Bowen et al. |
| 6,037,279 A | 3/2000 | Brookman et al. |
| 6,042,141 A | 3/2000 | Welch et al. |
| 6,056,316 A | 5/2000 | Yamaji et al. |
| 6,073,961 A | 6/2000 | Bailey et al. |
| 6,113,141 A | 9/2000 | Baker |
| 6,149,194 A | 11/2000 | Breed et al. |
| 6,152,481 A | 11/2000 | Webber et al. |
| 6,168,191 B1 | 1/2001 | Webber et al. |
| 6,169,043 B1 | 1/2001 | Li |
| 6,176,515 B1 | 1/2001 | Wallner et al. |
| 6,177,365 B1 | 1/2001 | Li |
| 6,177,366 B1 | 1/2001 | Li |
| 6,199,898 B1 | 3/2001 | Masuda et al. |
| 6,200,915 B1 | 3/2001 | Adams et al. |
| 6,220,309 B1 | 4/2001 | Sollars, Jr. |
| 6,239,046 B1 | 5/2001 | Veiga et al. |
| 6,250,668 B1 | 6/2001 | Breed et al. |
| 6,270,113 B1 | 8/2001 | Wipasuramonton et al. |
| 6,294,487 B1 | 9/2001 | Keshavaraj |
| 6,344,251 B1 | 2/2002 | Keshavaraj et al. |
| 6,348,543 B1 | 2/2002 | Parker |
| 6,350,709 B1 | 2/2002 | Veiga |
| 6,364,356 B1 | 4/2002 | Keshavaraj |
| 6,429,155 B1 | 8/2002 | Li et al. |
| 2001/0005660 A1 | 6/2001 | Li et al. |
| 2001/0009829 A1 | 7/2001 | Sollars, Jr. et al. |
| 2001/0042980 A1 | 11/2001 | Sollars, Jr. |
| 2001/0049243 A1 | 12/2001 | Crouch et al. |

FIG. 16

LAMINATED MULTI-DENIER MIXED FABRICS FOR USE IN INFLATABLE VEHICLE RESTRAINT SYSTEMS

CROSS REFERENCE TO RELATED APPLICATIONS

This application is a continuation-in-part of application Ser. No. 09/389,711, filed Sep. 3, 1999, now U.S. Pat. No. 6,455,449, and is also a continuation-in-part of application Ser. No. 10/038,207 filed Jan. 4, 2002, published Oct. 10, 2002 as Publication No. 2002/0145276 A1, said application Ser. No. 10/038,207 being a continuation-in-part of application Ser. No. 09/921,979, filed Aug. 3, 2001, published Nov. 28, 2002 as Publication No. 2002/0175510 A1, which claims priority of provisional application No. 60/293,613, filed May 25, 2001, said application Ser. No. 09/921,979 also being a continuation-in-part of application Ser. No. 09/493,628, filed Jan. 28, 2000, now U.S. Pat. No. 6,458,724, said application Ser. No. 09/493,628 being a continuation-in-part of application Ser. No. 09/327,243, filed Jun. 7, 1999, now U.S. Pat. No. 6,239,046, and application Ser. No. 09/327,244, also filed Jun. 7, 1999, now abandoned in favor of continuation application Ser. No. 09/956,639, filed Sep. 19, 2001, published Feb. 21, 2002 as Publication No. 2002/0022420 A1; said application Ser. No. 09/921,979 also being a continuation-in-part of application Ser. No. 09/327,245 filed Jun. 7, 1999, now abandoned in favor of application Ser. No. 09/956,640 filed Sep. 19, 2001, published Dec. 12, 2002 as Publication No. 2002/0187696 A1; said application Ser. No. 10/038,207 also being a continuation-in-part of said application Ser. No. 09/956,639, filed Sep. 19, 2001, published Feb. 21, 2002 as Publication No. 2002/0022420 A1, which is a continuation of said application Ser. No. 09/327,244, filed Jun. 7, 1999, now abandoned; said application Ser. No. 10/038,207 also being a continuation-in-part of said application Ser. No. 09/956,640, filed Sep. 19, 2001, published Dec. 12, 2002 as Publication No. 2002/0187696 A1, which is a continuation of said application Ser. No. 09/327,245, filed Jun. 7, 1999, now abandoned. All of these applications are fully incorporated by reference herein and made a part of this disclosure.

BACKGROUND OF THE INVENTION

1. Field of the Invention

This invention relates to multi-denier mixed textile fabrics for use in inflatable vehicle occupant restraint systems. More particularly, the invention relates to textile fabrics woven with fibers and yarns of different materials and denier sizes in either or both of the warp and fill directions and laminated with a film having adhesive and sealing properties useful in the manufacture of air bags and side curtains with improved physical characteristics.

2. Description of the Related Art

Current restraint systems for automotive vehicles include driver and passenger side air bags that are instantaneously gas-inflated by means such as by explosion of a pyrotechnic material at the time of a collision to provide a protective barrier between vehicle occupants and the vehicle structure. Much of the impact of a collision is absorbed by the air bag, thus preventing or lessening the possibility of serious bodily injury to occupants of the vehicle. Such air bags are located, typically, in a collapsed, folded condition housed in the steering wheel, to protect the driver, and in the dashboard, to protect a passenger seated next to the driver. Recently, the automotive industry also has introduced air bags that are stored in the back of the front seats or in the rear seats to protect the cabin occupants in the event of a collision occurring on either side of the vehicle.

More recently still, a further safety feature that is made available for passenger vehicles, especially the so-called sport utility vehicles or SUVs, are side-impact protective inflatable side curtains designed to provide a cushioning effect in the event of side collisions or rollover accidents. These side curtains are stored in the roof of the vehicle and, in the event of a collision, deploy along the interior side walls of the SUV's cabin.

Each of these various types of air bags has different design and physical property requirements, such as gas (air) holding permeability, air pressure and volume, puncture resistance and adhesion of the coating material to a woven substrate. For example, driver side air bags must have little or no permeability and, as a result, are often made from a material having very little or no permeability. Passenger side air bags, on the other hand, require a controlled permeability, and are most often made from materials having some degree of permeability. Furthermore, all such vehicle air restraint devices must have superior packageability and anti-blocking qualities. Packageability refers to the ability for a relatively large device to be packaged in a relatively small space. Anti-blocking refers to the ability of the device to deploy almost instantaneously without any resistance caused by the material sticking to itself.

The air holding capability of side curtains is critical since they must remain inflated for an extended period of time to protect passengers in multiple rollovers. Unlike air bags which are designed to inflate instantaneously, and to deflate almost immediately after inflation in order to avoid injury to the driver and front seat passenger, air curtains used in SUVs, or in ordinary passenger vehicles, must be capable of remaining inflated in the range of from about three (3) to about twelve (12) seconds, depending upon the size of the curtain and the type of vehicle. An average passenger vehicle would require a side curtain of from about 60 inches to about 120 inches in length as measured along the length of the vehicle, and a larger vehicle, such as a minivan, would require an even longer side curtain. The maximum inflation period of a side curtain should be sufficient to protect the cabin occupants during three (3) rollovers, the maximum usually experienced in such incidents.

When such air bags are deployed, depending upon their specific location or application, they may be subjected to pressures within a relatively broad range. For example, air bag deployment pressures are generally in the range of from about 50 kilopascals (kpa) to about 450 kpa, which corresponds generally to a range of from about 7.4 pounds per square inch (psi) to about 66.2 psi. Accordingly, there is a need for fabric products and air bags which can be made to be relatively impermeable to fluids under such anticipated pressures while being relatively light in weight.

One means of improving air holding capability in vehicle restraint systems has been through coatings such as chloroprene and silicone rubber coatings, applied to the textile substrate. Wherever coated fabrics are used there exists the problem of insufficiency of adhesion of the coating to the fabric substrate. More particularly, the smoother the substrate surface, generally the more difficult it is to obtain strong adhesion of the coating material to the substrate. Furthermore, with some coatings such as silicone rubber, radio frequency (RF) heat sealing techniques cannot be used to form the bag. Thus, in such instances bags are usually made by stitching, a process which requires the addition of an adhesive sealant in the stitched areas.

There have recently been developed improved polyurethane, acrylic, polyamide and silicone coatings that are coated in layers on the fabric substrates. It has been found that adhesion characteristics are greatly unproved with such layered coatings. Examples of such coated fabrics and methods of coating such fabrics are disclosed in commonly assigned application Ser. No. 09/327,243, now U.S. Pat. No. 6,239,046, Ser. No. 09/327,244, filed Jun. 7, 1999, now abandoned, and Ser. No. 09/327,245, filed Jun. 7, 1999, now abandoned, the disclosures of which are incorporated herein by reference and made a part of this disclosure.

In general, yarn sizes are measured by a well known weight indicator referred to as "denier" and identified as units "D". The greater the denier (D), the thicker and heavier is one unit of length of the yarn. The most common denier yarns presently used in such air holding devices are 420D nylon, in a 46×46 or 49×49 count weave, for driver side air bags, and 630D nylon, in a 41×41 count weave, for passenger side air bags. However, deniers as low as 210D, in a 72×72 count weave, have been used where the air bag must be housed in a tight fit, and, to a lesser extent, a 315D yarn, in a 60×60 count weave.

U.S. Pat. No. 5,704,402 discloses an uncoated air bag fabric in which weave constructions are stated to provide air bags with air permeability which does not increase by more than about fifty percent from the untensioned state when the fabric is subjected to tensile forces. These textile fabrics are stated to include yarns of different deniers within the weaves. Air bags of this type are typically used as passenger side air bags and are unsuitable for use in driver side air bags or side curtains, which must have little or no air permeability.

U.S. Pat. No. 5,863,644 discloses woven or laid structures using hybrid yarns comprising reinforcing filaments and lower melting matrix filaments composed of thermoplastic polymers to form textile sheet materials of adjustable gas and/or liquid permeability. During the formation of textile fabrics in accordance with the disclosure, polyester fibers in the weaves are melted by the application of heat to form textile sheet materials which are stated to have predetermined gas and/or liquid permeability.

U.S. Pat. No. 5,881,776 relates to a rapier woven low permeability air bag fabric and an air bag for use in a motor vehicle. The fabric is of plain weave construction and has an air permeability of less than approximately 5.0 CFM. The air bag is comprised of a plurality of panels connected together about their respective peripheries.

While these known fabrics represent somewhat successful attempts to control permeability through the incorporation of one or more features, none of these attempts have adequately solved the problem of providing a fabric of adequate impermeability whereby controlled permeability may be incorporated, where required. The present invention relates to a mixed woven coated textile fabric having yarns of different denier sizes woven for use in such inflatable air bag or side curtain restraint systems which not only provides improved adhesion of the coating to the textile substrate, but more effectively limits permeability and provides enhanced physical properties of the woven substrate, yet leaving available controlled permeability through the use of selectively sized venting apertures or other means.

In addition to the foregoing, there has been described in U.S. application Ser. No. 09/921,979, filed Aug. 3, 2001, published Nov. 28, 2002 as Publication No. 2002/0175510 A1, and its continuation-in-part application Ser. No. 10/038,207, filed Jan. 4, 2002, published Oct. 10, 2002 as Publication No. 2002/0145276 A1, both of which disclosures are incorporated by reference herein and made a part of this disclosure, a laminated multi-layered woven product having preconfigured air holding cavities. This product is known in the industry as a one piece woven (OPW) air bag or curtain. The present invention provides an improved laminated one piece woven air bag or curtain resulting from the use of multi-denier textiles, which imparts greater reinforcement and bonding properties to the product.

SUMMARY OF THE INVENTION

It has been found that by weaving yarns of different deniers, as for example, a low 15 denier yarn with a higher denier yarn of the same or different continuous filamentary or fibrous materials in either or both of the warp or fill directions, coating adhesion and other physical properties of the woven textile fabric are greatly improved. In particular, if for example, nylon yarns of different deniers are interwoven, the difference in deniers creates an uneven, or relatively rough surface to which polymer coatings will adhere more securely than if the surface were smooth. Further, if nylon yarns of one denier are interwoven with, for example, yarns of a different denier and different fiber material, such as aramid fiber, the woven textile fabric would not only have greater adhesion capability for coatings, but would also have increased puncture resistance properties. In addition, the use of low denier yarns woven with high denier yarns greatly improves the packageability of the air bag or side curtain for storage, while reducing the weight of the bag. Broadly stated, fabrics for such air bags generally can weigh from about 4.0 ounces per square yard (osy) to about 10.0 ounces per square yard (osy). In actual use, however, on the average, fabrics for such air bags generally weigh from about 5 to about 6 ounces per square yard. It has now been found that by combining different size and types of yarns in a single fabric weave, the strength and weight of the resultant fabric can be selectively controlled. For example, yarns of a given denier can be utilized in the warp with yarns of a lesser denier in the fill direction. Also, the warp yarns can be comprised of yarns of different deniers in an alternating regular or random fashion and the fill yarns can be comprised of yarns of the same denier or of varying or alternating deniers. Moreover, individual yarns can be comprised of continuous filaments of varying sizes blended together, or blended with other natural or synthetic fibers to control strength and weight factors inherent in the final fabric product. As will be seen hereinbelow, such combinations provide not only strength and weight benefits, but also surface adhesion properties for coating the fabrics to render them substantially impermeable to fluid pressure.

A coated woven textile fabric is disclosed, which comprises synthetic yarns of more than one denier, and a polymeric coating on at least one side thereof, the yarns and the polymeric coating being preselected respectively in deniers and thickness so as to render the fabric substantially impermeable to fluid under pressure. According to one preferred embodiment the fabric is comprised of warp yarns of about 315D nylon and fill yarns of about 210D nylon. According to another embodiment the fabric is comprised of warp yarns of about 420D nylon and fill yarns of about 315D nylon. According to yet another embodiment the fabric is comprised of warp yarns of from about 315D to about 420D nylon and fill yarns of from about 195D to about 380D aramid.

An embodiment of the invention is disclosed wherein the fabric is comprised of warp yarns of more than one denier and fill yarns of more than one denier. This fabric may be comprised of warp yarns of from about 210D to about 315D nylon and fill yarns of about 210D nylon, and the yarns are selected from the group consisting of nylon, polyester, aramid and graphite and combinations thereof.

The coating on at least one side of the fabric is preferably a thin polyurethane layer, but may also be comprised of polysiloxane, polyamide or acrylic type polymers. The same or an alternative coating may be provided on the other side of the fabric. It has been found that the coated fabric according to the invention provides excellent fluid impermeability while retaining packageability and anti-blocking qualities.

A flexible lightweight air bag for receiving and containing fluid under pressure for use in a vehicle air restraint system is also disclosed, which comprises a textile fabric according to the invention which is woven of synthetic yarns of more than one denier, and has a polymeric coating on at least one side of the fabric. The yarns and the polymeric coating are preselected respectively in deniers and thickness so as to render the air bag capable of receiving and retaining fluid under pressure in a vehicle air restraint system. The polymeric coated fabric is substantially impermeable to the fluid.

The coating on at least one side of the fabric is preferably a thin polyurethane layer, but may also be comprised of polysiloxane, polyamide or acrylic type polymers. The same or an alternative coating may be provided on the other side of the fabric forming the air bag. It has been found that the fabric according to the invention provides excellent fluid impermeability while retaining packageability and anti-blocking qualities.

In another embodiment of the present invention, fibers and yarns of different materials and denier sizes are woven into a one piece air bag structure having preconfigured air holding pockets and laminated with a film having adhesive and sealing properties. Weaving the side air curtains directly on a loom to produce a multi-layered woven product having pre-configured air holding cavities is much more economical in terms of cost of production and ease of shipping than sewing or welding pre-configured pieces of coated textile fabric. Pre-configured woven side air curtains require minimal cutting and essentially no joining of separate pieces, and are ready for coating as they come off the loom. Since the multi-layered fabric is woven from uncoated yarn, the curtain must be coated after weaving to impart the desired sealing and adhesive properties to the product. The difficulty inherent in coating a pre-configured multi-layered woven product is that the liquid coating material, e.g. polyurethane, can soak through the outer layers of woven fabric and penetrate the interior of the curtain. When this occurs and the coating hardens with heat and pressure, the sides of the curtain will stick together, preventing or substantially hindering the opening of the air pockets and deployment of the curtain when it is needed. Moreover, in order to make the side air curtain impermeable to air, the coatings require large concentrations of polysiloxane or other rubber-like materials, which produce a very heavy and bulky curtain that is not easily folded and stored. The use of multi-denier fibers and yarns in one piece woven (OPW) air bags and side air curtains provides these structures with all of the advantages imparted to the coated air bag fabrics that are discussed herein. The use of multi-denier fibers and yarns in the manufacture of OPW structures imparts additional needed strength to the seams and substantially improves their adhesion and bonding characteristics.

In the manufacture of one piece woven (OPW) air bag structures, a solid polymeric film is laminated to the outer surfaces thereof to make it air tight to very high pressures for extended periods of time. In the process of making the air curtains of this invention, an adhesive polycarbonate, polyether, or polyester aliphatic polyurethane prime coat layer is first coated onto a multi-denier woven textile substrate having preconfigured air holding cavities. A solid polymeric film, such as polyamide, polyolefin, polyether, polyester, polycarbonate or polyurethane, is laminated to the outer surfaces of the structure. In one embodiment of the invention, an adhesive prime coat layer is applied to the surface of the textile substrate, which can be woven nylon, polyester, or other synthetic fibers, through rotogravure or direct coating and allowed to dry. A solid polymeric film, such as polyamide, polyether, polyester, polycarbonate, polyolefin or polyurethane film, is then applied to the prime-coated textile substrate by means of hot film lamination, through the use of heat and pressure.

In an alternative embodiment of the invention, a multi-layered composite film product, whose structure and method of production is disclosed in co-pending application Ser. No. 10/038,207, published Oct. 10, 2002 as Publication No. 2002/0145276 A1, which is incorporated by reference herein, can be used as a film laminate without the need for first applying a prime coat adhesive layer to the textile substrate. In this connection, the adhesive prime coat and the polymeric film laminate are applied to the multi-denier woven textile substrate in a single step via the film laminate itself. The methods and products of this invention thus permit an automotive protective device such as a side air curtain to be pre-configured or prefabricated to numerous varied designs and shapes prior to coating which will result in economies of operation and reduce the cost of manufacturing these devices.

BRIEF DESCRIPTION OF THE DRAWINGS

Preferred embodiments of the invention are described hereinbelow with reference to the drawings, wherein.

DETAILED DESCRIPTION OF THE INVENTION

According to the present invention it has been found that coated multi-denier mixed woven textile fabrics for use in inflatable air bags or side curtains, whether of the same or different materials, provide greatly improved coating adhesion and other desired physical properties over a textile fabric woven from yarns of the same denier. In particular, it has been found that a combination of woven yarns of differing deniers form a fabric having ridges and valleys in the weave which provide a much greater surface area for adhesion of synthetic polymeric coatings to the woven substrate which, in turn, increases the adhesion of the coating material to the woven fabric substrate. Further, the textile material of the present invention can be woven to specific tensile strength or puncture resistance requirements by selectively increasing or decreasing the denier sizes of the yarns or by introducing puncture resistant or other types of materials into the weave.

Although the preferred textile materials for use in air bags are yarns of nylon and polyester, other synthetic materials can be used according to the invention. For example, aramid yarns such as KEVLAR®, produced by E. I. DuPont de Nemours & Company, SPECTRA® produced by Allied Signal Corporation, or PBI®, produced by Celanese Corporation, can be used in the weave. Non-polymeric materials such as graphite, natural fibers or blends of natural fibers such as cotton, and synthetic filaments such as polyester can also be used to advantage in the weave. It has been found that woven combination fabrics that incorporate aramid yarns provide greater puncture protection to the side curtain where danger from broken glass exists. Weave combinations, such as nylon and cotton, for example, can also be used to create different physical properties, such as providing additional flexibility to the coated fabric. Weaves of aramid yarns alone may also be used in the invention. In general, the synthetic yarns are each formed of bundles of continuous filaments temporarily held together for weaving by a suitable sizing compound such as polyvinyl alcohol, which also provides lubricity for weaving. After weaving, the sizing compound is generally removed from the fabric by a known scouring process. Polymeric coated fabrics for uses in air-holding vehicle restraint systems and methods of coating such fabrics are disclosed in the aforementioned commonly assigned application Ser. No. 09/327,243, now U.S. Pat. No. 6,239,046, Ser. No. 09/327,244, filed Jun. 7, 1999, now abandoned, and Ser. No. 09/327,245, filed Jun. 7, 1999, now abandoned which are incorporated herein by reference.

When the woven textiles of the present invention are coated as, for example, with polyurethane, silicone rubber, polysiloxane, or polyamide and acrylic type polymers, the air holding characteristics of the woven textile can be adjusted as required such as by vents or other appropriate means for the particular application involved. This allows for the use of different denier materials to be used for the driver side and front passenger type air bags than those that are used for the side curtains. Also, the thickness of the polymeric coating can be pre-selected to be combined most effectively with yarns of differing and preselected deniers to provide a coated fabric which is most effective in terms of pressure fluid impermeability, packageability, puncture resistance and the like.

The yarns of the present invention can be of deniers ranging from about 70D to about 1200D to produce products having weave counts of from about 20 to about 150 yarns per inch. Textile weights can range from about 4.0 to about 10.0 ounces per square yard (osy). These types of multi-denier weave combinations exhibit improved tear resistance and adhesion on lightweight denier textiles to be used in air bag and side curtain applications. Higher denier nylon and aramid yarns provide greater tear resistance. In addition, these types of denier combinations and constructions can be woven with unsized yarns utilizing LDPF (low denier per filament) Hi-tenacity yarns, manufactured by DuPont, or with high shrinkage yarns. The woven textiles of the invention can also be blends of aramid yarn with nylon, polyester or other synthetic yarns.

For purposes of this invention, weaves of different types are contemplated, such as, for example: plain weaves, consisting of yarns in an alternating fashion, one over and one under every other yarn; basket weaves, in which two or more warp yarns are alternately interlaced over and under each other; leno yarns, in which the yarns are locked in place by crossing two or more warp threads over each other and interlacing with one or more filling threads; twill weaves, characterized by a diagonal rib created by one warp yarn floating over at least two filling yarns; four harness satin weave where a filling yarn floats over three warp yarns and under one; an eight harness satin weave, which is similar to the four harness satin weave except that one filling yarn floats over seven warp yarns and under one; and high modulus weave where high impact resistance and high strength are required. Detailed descriptions of such weaves are described in textile publications such as a publication of Clark-Schwebel Joint Ventures, CS-Interglas A. G., the disclosure of which is incorporated herein by reference.

A preferred construction for the multi-denier weave of the invention is a plain weave of 315D×420D nylon, with a weave count of 46×46. A weave of this construction has been found to provide greatly improved adhesion characteristics, better packageability and excellent tensile strength. As disclosed herein, other deniers can be used within the ranges specified to provide the advantages of the invention. Similarly, when a combination of different yarns is used in the weave, such as nylon and aramid yarns, the preferred weave would be a warp nylon of 315D or 420D with a 195D or 380D Kevlar® yarn. In general, it has been found that by combining low denier yarns with high denier yarns, the lower denier yarns reduce the weight of the fabric, yet the fabric retains the benefits of strength and weight through the high denier yarns incorporated therein.

Figure 1:
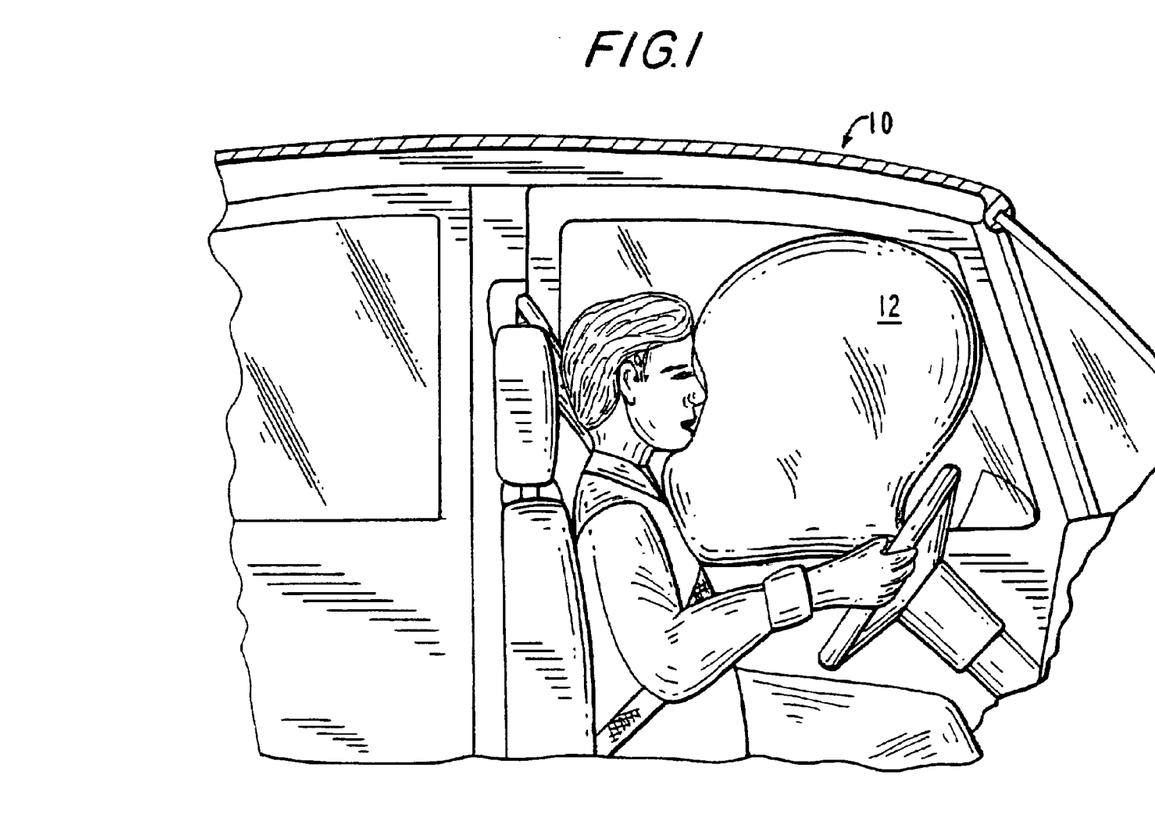
FIG. 1 is a partial cross-sectional side elevational view of a driver's side of an automobile showing a deployed air holding restraint bag made of the lightweight textile fabric constructed according to the present invention.

Referring now to FIG. 1, there is shown a partial cross-sectional side elevational view of a driver's side of an automobile 10 showing a deployed air restraint bag 12 made of a lightweight coated fabric constructed according to the present invention. The air bag is preferably constructed of a plain weave fabric as will be described hereinbelow, coated on one side with a thin layer of polyurethane. The coating is preferably 0.001 to 0.010 inch in thickness (i.e., 1–10 mils), but may be up to about 0.020 inch in thickness (i.e., 20 mils) without substantially compromising packageability. The air restraint bag shown is exemplary of a driver's side air bag which is deployed from the steering column of the vehicle. Although not shown, as noted previously, air restraint systems including side curtains are also contemplated within the scope of the invention.

Figure 2:
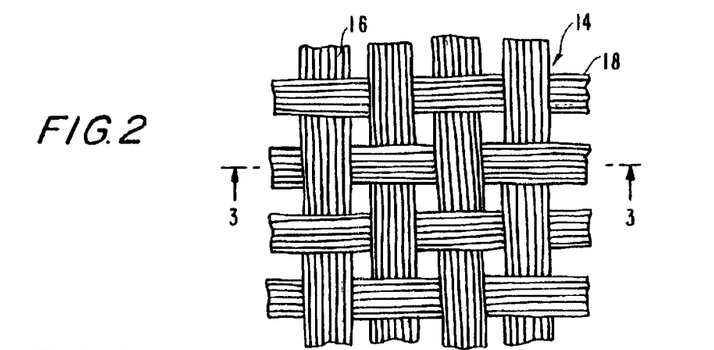
FIG. 2 is a greatly enlarged, partial schematic representation of a lightweight woven fabric of the invention, comprised of nylon yarns of different deniers.
Figure 3:
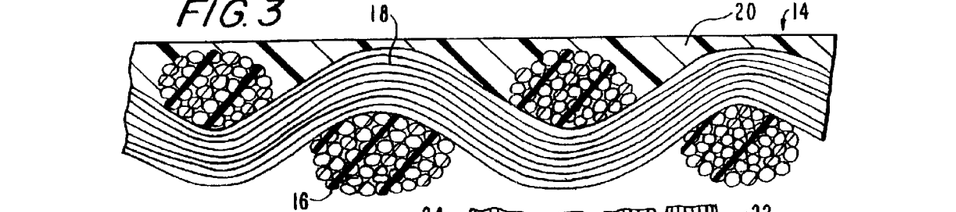
FIG. 3 is a cross-sectional view of the fabric of FIG. 2, taken along line 3—3 of FIG. 2, with a polymeric coating added to one side thereof.

One preferred embodiment of the invention, is shown in FIG. 2, in which a lightweight woven fabric 14 is comprised of nylon yarns 16 of 315D in the warp direction and nylon yarns 18 of 210D in the fill direction. This blend, when coated with a polymeric coating 20 such as polyurethane, as shown in FIG. 3, provides a woven textile air bag fabric of the type shown in FIG. 1, with little or no permeability, improved packageability and strength, as well as improved coating adhesion properties. In particular, warp yarns 16 and fill yarns 18 are comprised of bundled nylon continuous filaments having little or no twist and held together by a suitable sizing agent such as polyvinyl alcohol, a compound which provides lubricity for weaving. The resulting fabric is as shown with yarns which are actually woven together in close proximity to permit little or no air permeability between the yarns. The greatly enlarged representation in the drawings are presented for illustration purposes whereby the spaces between the yarns are also greatly enlarged. In particular, it has been found that the particular construction of yarn deniers disclosed herein, combined with the stated preferred coating thickness, provides substantial impermeability to fluid under pressure, while retaining high strength, low weight, superior packageability and non-blocking qualities. Moreover, the fabric's puncture resistance can be modified by combining aramid fibers such as KEVLAR® into the weave.

In FIG. 3, a significant feature of the weave of FIG. 2 is illustrated by enlarged cross-sectional view, in that the different size yarns create a relatively uneven surface, with small crevices and interstices which more readily promote adhesion of the polyurethane coating 20 to the fabric 14 as shown. Other coating materials such as chloroprene and silicone rubber or the like have been found to adhere to the subject fabric with comparable improvement.

Figure 4:
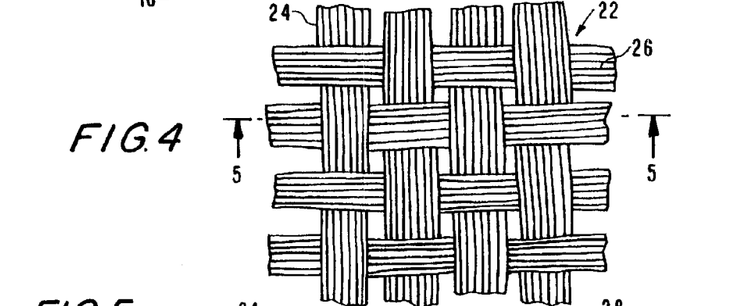
FIG. 4 is a greatly enlarged partial schematic view of an alternative embodiment of the lightweight woven fabric of the invention, comprised of nylon yarns of alternative different deniers.
Figure 5:
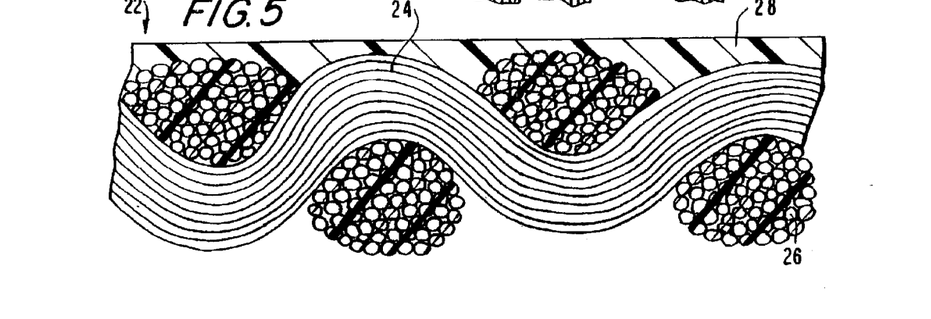
FIG. 5 is a cross-sectional view of the fabric of FIG. 4, taken along line 5—5 of FIG. 4 with a polymeric coating added to one side thereof.

In FIG. 4 there is shown a weave 22 of nylon yarns 24 of 420D in the warp direction 20 and nylon yarns 26 of 315D in the fill direction. This combination of yarn weights would more commonly be used in driver side air bags or side curtains. Moreover, the weave shown in FIG. 4 provides much greater adhesion for coatings than a weave comprised entirely of a yarn of only one denier, as is evident from the enlarged cross-sectional view of the fabric shown in FIG. 5, with coating 28 of polyurethane added thereto on one side. Alternatively, the same type of coating may be placed on the opposite side of the fabric.

Figure 6:
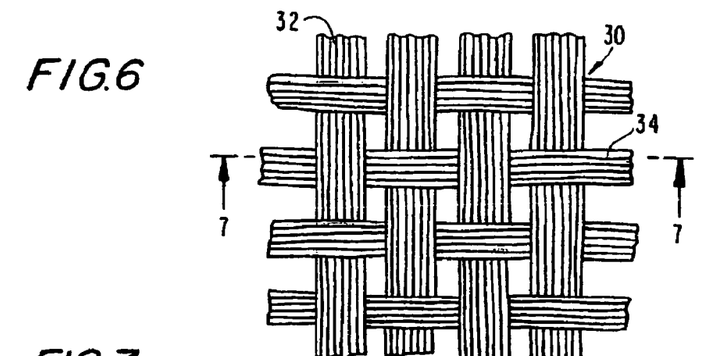
FIG. 6 is a greatly enlarged partial schematic view of another alternative embodiment of the lightweight fabric of the invention, comprised of nylon and aramid yarns of different deniers.
Figure 7:
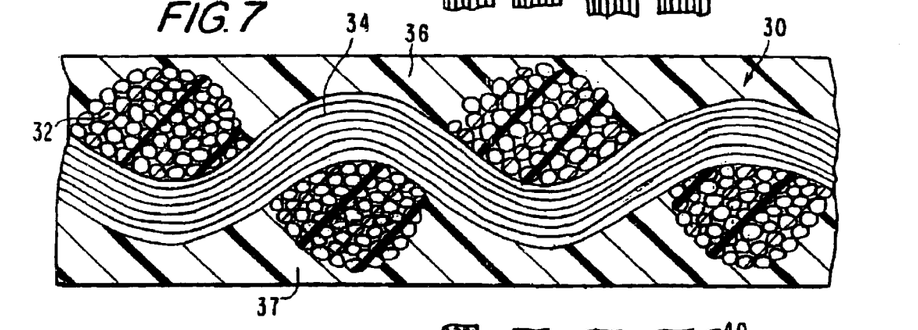
FIG. 7 is a cross-sectional view of the fabric of FIG. 6, taken along line 7—7 of FIG. 6, illustrating an alternative embodiment of the invention wherein a polyurethane coating is added to both sides of the fabric.

In FIG. 6 there is shown a greatly enlarged view of a woven fabric 30 of nylon and aramid yarns in which the warp yarn 32 are comprised of 310D nylon and fill yarns 34 are aramid yarns such as 195D KEVLAR® brand aramid yarn. This weave provides improved adhesion of the polymeric coating by providing peaks and valleys between the yarn, as well as small crevices and interstices therebetween, all facilitated by the combination of different yarn sizes. Also greatly improved puncture resistant properties are provided by the nylon and the aramid yarn which renders the material especially suitable for side curtains. It should be understood that weaves in which the aramid yarns are woven in the warp direction are contemplated in this invention as well. Referring to FIG. 7 there is shown a cross-sectional view of the woven fabric shown in FIG. 6, showing the multi-filament nylon yarn 32 in cross-section which are greater in size—preferably twice the size—than the KEVLAR® fill yarn 34. In FIG. 7, there is also illustrated still another alternative embodiment of the present invention whereby polymeric coatings 36, 37 are respectively added to each side of the fabric as shown. It has been found that the improved adhesion between the fabric 30 and the coatings 36, 37, combined with the combination of yarn sizes as disclosed herein, provides a fabric having little or no fluid permeability without compromising packageability. Accordingly, the fabric shown uncoated in FIG. 6 will provide a finished air bag having superior qualities when coated on both sides in FIG. 7.

Figure 8:
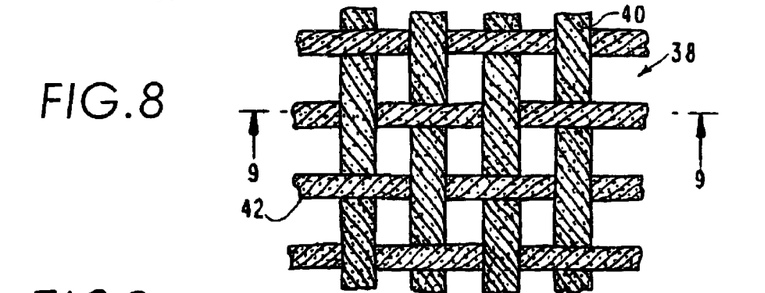
FIG. 8 is a greatly enlarged view of still another alternative embodiment of the lightweight fabric of the invention, comprised of blended yarns of synthetic filamentary materials and natural fibrous materials such as nylon and cotton yarns of different deniers.
Figure 9:
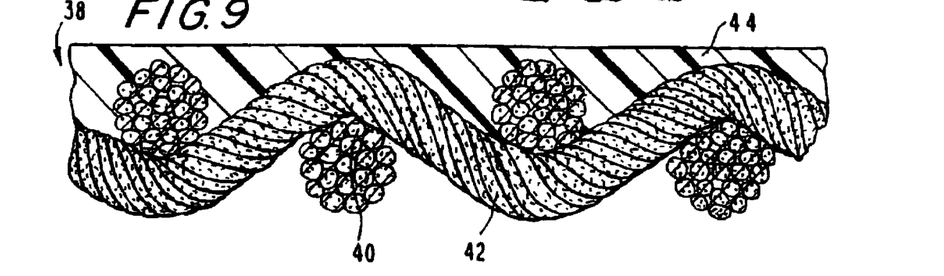
FIG. 9 is a cross-sectional view of the fabric of FIG. 8, taken along line 9—9 of FIG. 8, with a polymeric coating added to one side thereof.

Referring now to FIG. 8, there is shown a top plan view greatly enlarged, of a weave construction 38 of a combination of yarns comprised of warp yarns 40 of 315D nylon continuous filaments blended with cotton fibers with standard twist to retain the fibers and the continuous filaments together in yarn form. In the woven fabric of FIG. 8, the blended yarns 40 in the warp direction are about 315D and the blended yarns 42 in the fill direction are about 160D, or about one half the denier of the blended warp yarns 40. FIG. 9 is a cross-sectional view taken along line 9—9 of FIG. 8, with polyurethane coating 44 added on one side to promote impermeability.

It should be understood that yarns of other synthetic and natural fibers can be used in the invention. In particular, yarns of polyester fibers are contemplated, with weaves of different denier sizes as with nylon. One example of a polyester fabric of the invention would be a weave of 440D polyester with a 650D polyester. Blended yarns of polyester and cotton are also contemplated for use in the invention. Other blends and weaves can also be used in the invention. For example, yarns of different size deniers can be used in either or both of the warp and fill directions. Thus, a weave could comprise both 210D and 315D nylon yarns in either or both of the warp and fill directions. Other denier and fiber combinations are contemplated herein and can be used in the invention.

As can be seen, the present invention provides a coated woven multi-denier textile fabric for use in an air bag or side curtain having substantially improved adhesion and physical properties. Such fabrics may be of the same or different yarns and of two or more deniers. Moreover, as noted, various combinations of yarn deniers and sizes can be utilized in the fabric to control strength and weight factors. For example, as noted, different combinations of yarn deniers can be utilized in both the warp and the fill directions, depending upon the intended application. Moreover, the actual yarns can be comprised of continuous synthetic filaments of different sizes, or filaments and natural or synthetic fibers of different sizes blended to form the yarn.

In addition, when a solid polymeric film of polyamide, polyolefin, polyether, polyester, polycarbonate or polyurethane material has been hot laminated to the surface of a multi-denier OPW textile having pre-configured air holding cavities to produce a side air curtain, the air holding characteristics of the protective device are substantially improved and it will hold air at very high pressures for extended periods of time. The multi-denier textile substrate can be a woven nylon, polyester, or other synthetic fibers, all of which are well known in the art to be useful in the manufacture of air bags and side air curtains. The surface of the textile substrate to be film laminated is first coated with an adhesive prime coat to seal the fabric and provide a base to which an overlying solid polymeric film layer can be adhered. The prime coat material is formulated to be suitable for coating the textile fabric without soaking through to the interior of the air holding cavities and thus causing sticking or blocking, which would prevent its opening when the air bag is activated.

The adhesive polyurethane prime coat comprises a solution of an aliphatic or aromatic polyester polyurethane or polyether polyurethane based material or a polycarbonate based aliphatic polyurethane that is compounded with other materials such as weight stabilizers, heat stabilizers, flame retardants, colorants and blocked isocyanate. The presence of isocyanate is important because when sufficient heat and pressure is applied to the prime coat composition, the isocyanate becomes adhesively activated. At that point in the process the polyurethane reacts with and adhesively binds the overlying polymeric film layer. The result is a thermoset film-prime coat composite which adheres to the textile fabric, seals it, and makes it air tight and able to withstand high pressures for the relatively long periods of time required of an air curtain. The seams of such a structure exhibit increased strength and are better able to withstand the extreme pressures of inflation when activated.

Another prime coat adhesive composition comprising a solution of polycarbonate polyurethane, a hot melt polyurethane and an isocyanate, results in greatly improved bonding, heat resistance and heat aging properties in the film-laminated textile fabrics of the invention. The polycarbonate polyurethane provides bonding strength to the adhesive, so that the film laminate will firmly and securely adhere to the textile fabric, even after storage at elevated temperatures for extended periods of time. The hot melt polyurethane acts as an adhesion promoter by enabling the prime coat composition to flow smoothly and completely over the portion of the textile fabric that is to be laminated, thus ensuring a complete sealing of the side air curtain. The isocyanate provides a heat setting or cross linking function to the adhesive composition and serves to bond the film laminate to the fabric.

More specifically, the polycarbonate polyurethane component is a polycarbonate polyol-based aliphatic polyurethane. The hot melt component comprises a polyester or polyether-based polyurethane or copolymer blends of ethylene vinyl acetate (EVA). The isocyanate component is a blocked HDI isocyanate (hexamethylene diisocyanate), such as the HDI isocyanate manufactured by Bayer Corp. of Pittsburgh, Pa. To this prime coat adhesive composition may be added such additional materials as antibacterial additives, flame retardants, colorants, weight stabilizers and finely ground silica, such as AEROSIL 380®, which may be obtained from the Degussa Corp. of Ridgefield, N.J., and which serves as a reinforcement for the adhesive material.

The polycarbonate component provides bonding strength at elevated temperatures and improved heat aging properties. The hot melt component provides superior flow characteristics to the composition. However, too much of the hot melt component can result in reduced strength and heat aging properties, so its relative part-by-weight in the composition has to be adjusted carefully in relation to the polycarbonate polyurethane component of the mixture. The isocyanate component cross links with the polycarbonate and the hot melt components at the temperature and pressure of lamination. In general, the greater the amount of isocyanate present in the composition, the faster the adhesive sets. The part-by-weight ratio of isocyanate in the composition can vary from about 1:15, depending upon how fast it is desired to set the adhesive material. However, it is important that the adhesive prime coat not set or cure before the lamination step in the process.

Figure 10:
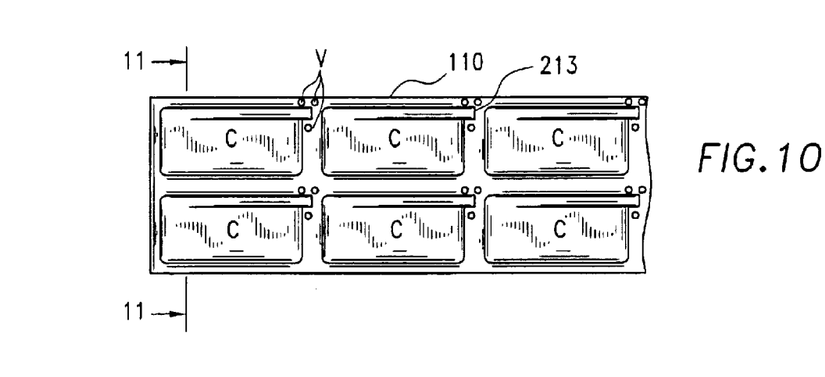
FIG. 10 is a top plan view of a position of a sheet of the multi-layered woven textile substrate unwound from a supply roll, showing multiple units of pre-configured side air curtains with air holding cavities.

In the film lamination of the invention, a solid polyamide, polyolefin, polyether, polyester, polycarbonate or polyurethane film is laminated to the surface of a prime-coated multi-layered woven textile fabric or to both outer surfaces of a prime-coated, pre-configured, multi-layered woven textile fabric to produce a film-textile-film laminate. The polymeric film laminate of the invention has a thickness of from about 0.2 mils to about 5.0 mils, and preferably from about 0.5 mils to about 1.0 mils. In one embodiment of the invention, as shown in FIG. 10, a one-piece woven multi-layered, multi-denier textile fabric 10, having a multiplicity of pre-configured side air curtains C, air vents V, and woven inflation inlets 213 is prime-coated on both top and bottom outer surfaces, dried, without activating the isocyanate, and later laminated on both outer surfaces under heat and pressure with a polyamide, polyolefin, polyester, polyether, polycarbonate or polyurethane film. The film laminate has a thickness of from about 0.2 mils to about 5.0 mils, with from about 0.5 mils to about 1.0 mils being preferred.

Figure 11:
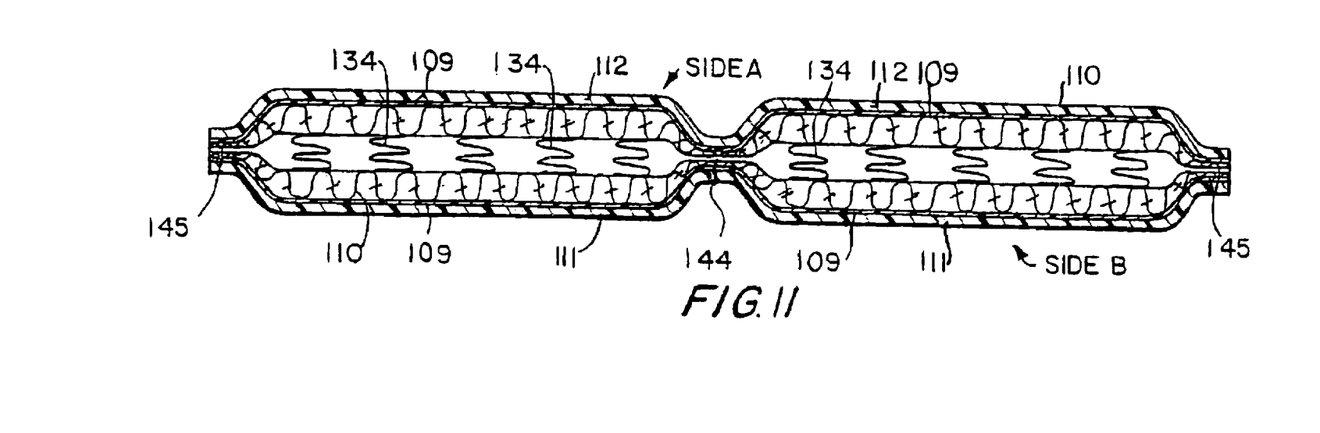
FIG. 11 is a cross-sectional view of the multi-layered, pre-configured textile substrate shown in FIG. 1 with film lamination.

A cross-section of the laminated multi-layered woven textile fabric taken across line 11—11 of FIG. 10 is shown in FIG. 11, wherein polymeric film coatings 111 and 112 are shown laminated on sides B and A, respectively, of textile fabric 110. The adhesive prime coat layer 109, which can be any of the above-mentioned adhesives of this invention, is shown between the film layer and the textile fabric. Suitable tethers 134 are provided to limit expansion of the fabric layers when the protective device is explosively deployed, and to maintain the desired expanded shape of the air curtain. Integrally woven connectors 144 and 145 between the multi-layered portions of the device are shown in FIG. 11.

Figure 12:
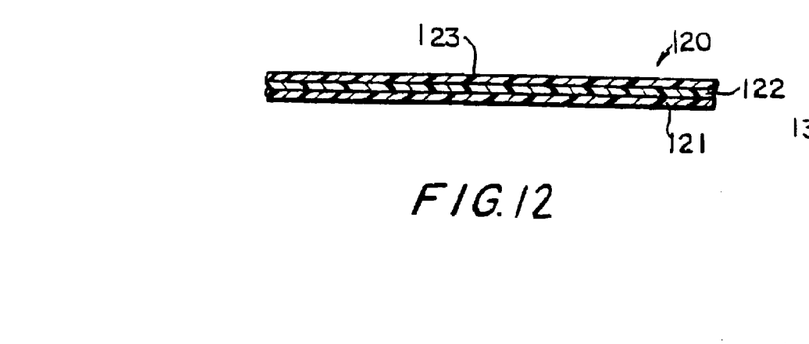
FIG. 12 is a cross-sectional view of one embodiment of the composite film laminate of the invention.

In an alternative embodiment of the invention, a multi-layered woven textile fabric is laminated by film transfer with a composite film structure that comprises both the polymeric film layer and the adhesive prime coat layer. In this embodiment, the composite film is applied to a multi-denier OPW textile fabric in one step rather than two, thus eliminating the need for a separate prime-coating step. As shown in FIG. 12, the composite transfer film 120 is formed by casting a solution of polyamide or aromatic or aliphatic polyether polyurethane or polyester polyurethane, a polycarbonate or polyamide material onto release paper 121. The carrier film layer 122, when solidified, becomes the film laminate of the invention, and has a thickness of from about 0.2 mils to about 5.0 mils, with from about 0.5 mils to about 1.0 mils being preferred. Typical solvents for the carrier film layer or film laminate are toluene, xylene, and dimethyl formamide (DMF). An adhesive prime coat layer 123 comprises a solution of an aliphatic or aromatic polyester or polyether polyurethane based material or a polycarbonate based aliphatic polyurethane compounded with other materials, is coated onto carrier film layer 122 after it (the film laminate) has been solidified. The prime coat layer has a thickness of from about 0.5 mils to about 5.0 mils, with from about 1.0 mils to about 1.5 mils being preferred. When the coating process has been completed and the film composite dried, the release paper is stripped away and it can then be laminated to the multi-layered multi-denier woven textile substrate.

Figure 13:
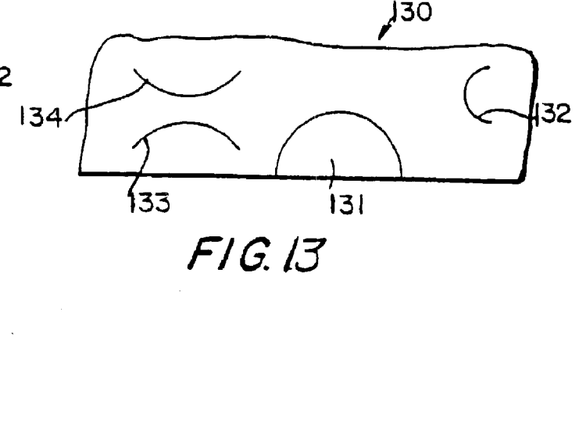
FIG. 13 is a schematic plan view of a multi-layered textile substrate with a pre-configured construction showing exemplary tethers and one exemplary dead air zone.
Figure 14:
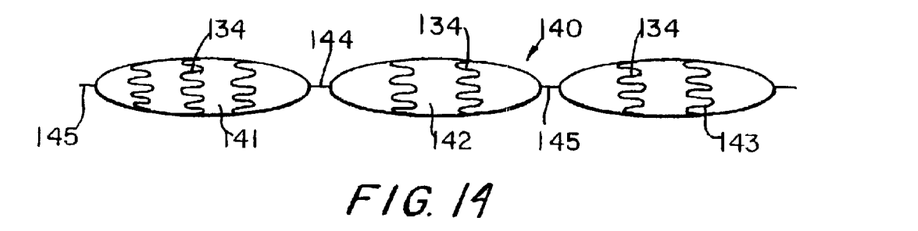
FIG. 14 is a schematic cross-sectional view of a multi-layered textile substrate of a pre-configured construction, with tethers.

The film-laminated multi-woven textile substrate when inflated will be substantially air tight. When deployed, these protective air bags are designed to hold air during a rollover accident for the entire rollover period. When laminated in accordance with this invention, air curtains having an initial inflation pressure of about 70–75 Kpa, will hold to a minimum of about 60 Kpa for about 10 to 12 seconds after inflation. Specific air cavity designs will alter the volume of air and the amount of pressure required. These multi-layered multi-denier textile substrates are designed to have different air cavity configurations and different internal tether designs as shown in FIGS. 13–16. In FIG. 13 there is shown a top plan view from the side of a multi-layered woven textile substrate with a pre-configured construction 130 of the invention, including a dead air zone 131 (not inflatable) and internal tethers 132, 133 and 134, which maintain the air curtain's configuration and keep it from pulling apart during inflation. FIG. 14 is a cross-sectional view of a multi-layered textile substrate 140 with internal air channels 141, 142 and 143, and integrally woven connectors 144 and 145. Tethers 134 are provided to control expansion and maintain the desired shape of the air curtain.

Figure 15:
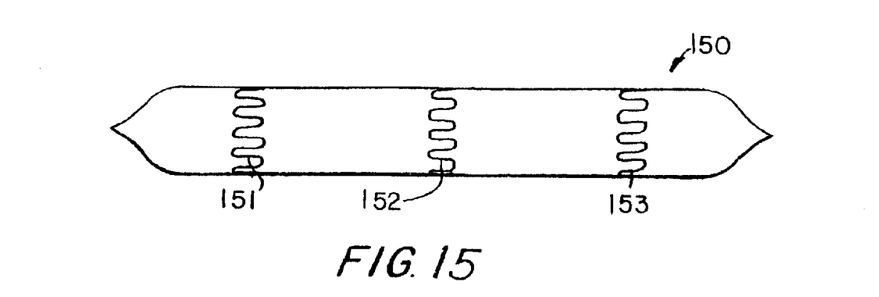
FIG. 15 is a schematic cross-sectional view of a tethered air curtain.

FIG. 15 is a cross-sectional view of a tethered side air curtain 150, showing internal tethers 151, 152 and 153 which limit the expansion of the side air curtain and maintain the shape when in the expanded state.

Figure 16:
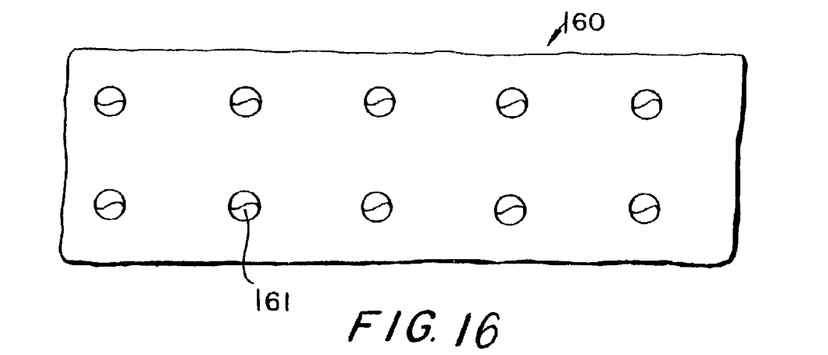
FIG. 16 is a schematic plan view of a multi-layered air curtain, illustrating another embodiment of tether.

FIG. 16 is a top plan view of a multi-layered tethered side curtain 160, having a multiplicity of tethers, such as that shown at 161. It is generally considered difficult to coat a multi-layered fabric similar to that shown in FIG. 8 with applied coating techniques or rotogravure direct coating without resulting in penetration of liquid adhesive through the textile material to the tethers. Unwanted gluing together of the tethers must be avoided because they are intended to open and expand when the bag is inflated.

In another embodiment of the invention, the multi-denier OPW air bag is woven in a manner so as to provide for venting of air entrapped during the lamination process described in commonly assigned U.S. applications Ser. No. 09/389,711, now U.S. Pat. No. 6,455,449, and Ser. No. 10/038,207, published Oct. 10, 2002 as Publication No. 2002/0145276 A1, referred to above. In the lamination process described therein a roll of woven textile air bags having preconfigured air holding cavities is unrolled and pulled through a continuous coating and lamination line. In this process, the woven textile fabric is first coated with an adhesive polyurethane coating material and then laminated under heat and pressure with a solid polymeric film. At the point in the process in which the woven textile fabric is coated with an adhesive material, it is effectively sealed and the preconfigured air holding cavities therein entrap air and form air bubbles. The air bubbles so formed impede the lamination process in which a solid polymeric film is laminated to the coated textile fabric under heat and pressure.

In the inventive product herein, air vents are woven into the textile fabric at the place where the OPW air bag or side curtain will later be cut to form an inlet for the inflation tube that is required in the finished product. These air vents may be formed, for example, by weaving the textile fabric so that the fill yarns are not interlaced with the warp yarns but are instead overlaid thereon. The absence of interlaced yarns provides for expansion of the fabric at these points, which permits air to be expelled when the textile fabric is pulled through the rollers in the lamination process. As a result, air is forced out ahead of the polymeric film laminate, thus providing for a smooth, strong lamination of the product.

Figure 17:
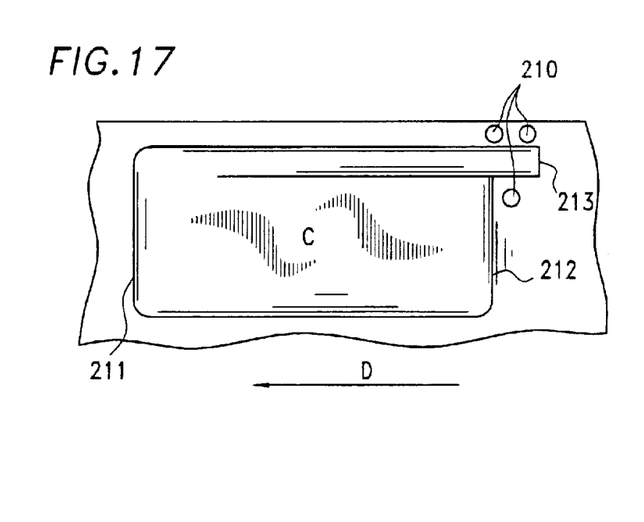

Referring to FIG. 17, a single multi-layered unit C of the one-piece woven, multi-layered, multi denier textile fabric shown in FIG. 10, is pulled in direction D in the lamination process. As the woven textile fabric is pulled through heat sealing rollers that are used to laminate the solid film thereto, air is forced back from the leading edge 211 of the unit toward the rear edge 212 of the unit and out of air vents 210. These air vents are usually situated around the woven inlets 213 that are later cut in the manufacturing process for receiving the inflation tubes in the completed air curtains. When the film lamination process has been completed, the air vents become sealed by the polyurethane adhesive coating and the solid film laminate. Removal of entrapped air and the elimination of air bubbles produces a film laminate that is smooth and secure.

Figure 18:
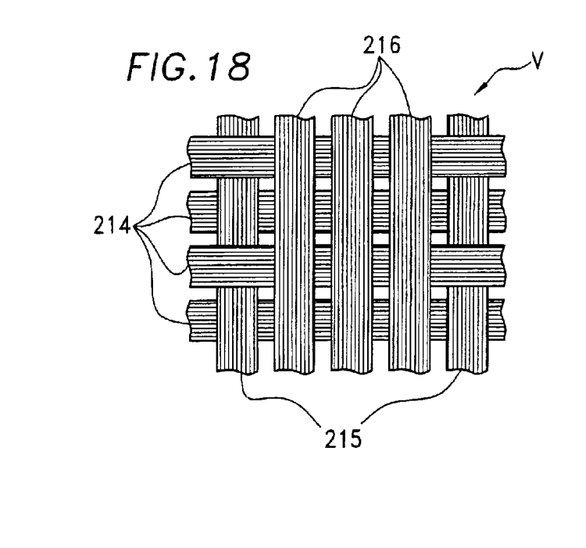

A single air vent V of the type 210 of FIG. 17 is shown greatly enlarged in FIG. 18. The air vent depicted therein shows warp yarns 214, fill yarns 215 interlaced with the warp yarns 214, and fill yarns 216 overlaying the warp yarns 214. At those places in the woven textile fabric where air vents are required, the fill yarns overlay the warp yarns, rather than interlace with them, thus creating a loose and expandable weave, which permits air to be expelled even after a coating of adhesive polyurethane has been laid down on the fabric. After any entrapped air has been expelled through the air vents, the textile fabric is sealed with a solid film laminate and remains sealed until it is later cut at the woven inlet tube position on the unit to provide an opening for an inflation tube (not shown). It should be understood that the warp and fill yarns shown herein are of the multi-denier type that is disclosed herein and may be of the various types and deniers described above. It is contemplated that other weave designs or even holes that are cut or drilled into the textile fabric may be utilized in the manufacture of air vents, so long as they serve to provide a means for entrapped air to be expelled.

While the preferred embodiments of the invention have been illustrated and described, using specific terms, such description has been for illustrative purposes only, and it should be understood that changes and variations may be made without departing from the spirit and scope of the invention which is defined by the claims appended hereto.

What is claimed is:

1. An automotive protective device comprising a textile fabric woven of synthetic yarns of at least two different deniers, an adhesive polymeric coating layer on at least one surface of said fabric, and a solid polymeric film laminated thereto.

2. The automotive protective device according to claim 1, wherein said synthetic yarns are selected from the group consisting of nylon, polyester, aramid and graphite and combinations thereof.

3. The automotive protective device according to claim 2, wherein said solid polymeric film laminate is a polyamide, polyolefin or polyurethane film.

4. The automotive protective device according to claim 3, wherein said woven textile fabric is comprised of warp yarns of about 315D nylon and fill yarns of about 210D nylon.

5. The automotive protective device according to claim 3, wherein said woven textile fabric is comprised of warp yarns of about 420D nylon and fill yarns of about 315D nylon.

6. The automotive protective device according to claim 3, wherein said woven textile fabric is comprised of warp yarns of from about 315D to about 420D nylon and fill yarns of from about 195D to about 380D aramid.

7. The automotive protective device according to claim 3, wherein said woven textile fabric is comprised of warp yarns of from about 210D to about 315D nylon and fill yarns of about 210D nylon.

8. The automotive protective device according to claim 3, wherein said woven textile fabric is comprised of warp yarns of at least two different deniers and fill yarns of at least two different deniers.

9. An automotive protective device comprising a textile fabric woven of synthetic yarns of at least two different deniers, an adhesive prime coat polyurethane layer coated on at least one surface of said woven textile fabric, and a solid polymeric film laminated thereto, said yarns and said solid polymeric film being preselected respectively in deniers and thickness so as to render said fabric substantially impermeable to fluid under pressure.

10. The automotive protective device according to claim 9, wherein said synthetic yarns are selected from the group consisting of nylon, polyester, aramid and graphite and combinations thereof.

11. The automotive protective device according to claim 10, wherein said woven textile fabric is comprised of warp yarns of about 315D nylon and fill yarns of about 210D nylon.

12. The automotive protective device according to claim 10, wherein said woven textile fabric is comprised of warp yarns of about 420D nylon and fill yarns of about 315D nylon.

13. The automotive protective device according to claim 10, wherein said woven textile fabric is comprised of warp yarns of at least two different deniers and fill yarns of at least two different deniers.

14. The automotive protective device according to claim 10, wherein said fabric is comprised of warp yarns of from about 210D to about 315D nylon and fill yarns of about 210D nylon.

15. An automotive protective device comprising a textile fabric woven of synthetic yarns of at least two different deniers and more than one filamentary material, an adhesive prime coat polyurethane layer coated on at least one surface of said woven textile fabric, and a solid polymeric film laminated thereto, said synthetic yarns and said solid polymeric film being preselected respectively in deniers and thickness so as to render said fabric substantially impermeable to fluid under pressure.

16. The automotive protective device according to claim 15, wherein said synthetic yarns are selected from the group consisting of nylon, polyester, aramid and graphite and combinations thereof.

17. The automotive protective device according to claim 16, wherein said solid polymeric film laminate is a polyamide, polyolefin or polyurethane film.

18. The automotive protective device of claim 3 wherein said adhesive prime coat polyurethane layer is a composition comprising: a polycarbonate based aliphatic polyurethane; a hot melt composition comprising a polyester or polyether-based polyurethane, or copolymer blends of ethylene vinyl acetate; and an isocyanate.

19. The automotive protective device of claim 18 wherein said adhesive prime coat polyurethane layer has a coating weight of from about 0.25 ounces per square yard to about 2.5 ounces per square yard.

20. The automotive protective device of claim 18 wherein said adhesive prime coat polyurethane layer has a coating weight of about 1.2 ounces per square yard.

21. The automotive protective device of claim 18 wherein said adhesive prime coat polyurethane layer has a solids content of from about 25% to about 45%.

22. The automotive protective device of claim 3 wherein said solid polymeric film laminate has a thickness of from about 0.2 mils to about 5.0 mils.

23. The automotive protective device of claim 3 wherein said solid polymeric film laminate has a thickness of from about 0.5 mils to about 1.0 mils.

24. An automotive protective device comprising a textile fabric woven of synthetic yarns of at least two different deniers and having two outer surfaces and preconfigured air holding cavities woven therein, each of said outer surfaces having an adhesive polyurethane prime coat layer and a solid polymeric film laminated thereto.

25. The automotive protective device according to claim 24, wherein said synthetic yarns are selected from the group consisting of nylon, polyester, aramid and graphite and combinations thereof.

26. The automotive protective device according to claim 25, wherein said solid polymeric film laminate is a polyamide, polyolefin or polyurethane film.

27. The automotive protective device according to claim 26, wherein said synthetic yarns are woven nylon.

28. The automotive protective device according to claim 26, wherein said polymeric film laminate has a thickness of from about 0.2 mils to about 5.0 mils.

29. The automotive protective device according to claim 26, wherein said polymeric film laminate has a thickness of from about 0.5 mils to about 1.0 mils.

30. The automotive protective device according to claim 26, wherein said adhesive prime coat layer has a thickness of from about 0.5 mils to about 5.0 mils.

31. The automotive protective device according to claim 26, wherein said adhesive prime coat layer has a thickness of from about 1.0 mils to about 1.5 mils.

32. The automotive protective device according to claim 26, wherein said adhesive prime coat layer comprises: a polycarbonate based aliphatic polyurethane; a hot melt composition comprising a polyester or polyether-based polyurethane, or copolymer blends of ethylene vinyl acetate; and an isocyanate.

33. A woven textile fabric for use in the manufacture of an automotive protective device comprising a multi-layered textile fabric of synthetic yarns of at least two different deniers and having air vents woven into said fabric at preselected locations, an adhesive prime coat polyurethane layer coated on at least one surface of said woven textile fabric, and a solid polymeric film laminated thereto, said yarns and said solid polymeric film being preselected respectively in deniers and thickness so as to render said fabric substantially impermeable to fluid under pressure.

34. The automotive protective device of claim 33, wherein said synthetic yarns are selected from the group consisting of nylon, polyester, aramid and graphite and combinations thereof.

35. The automotive protective device of claim 34, in which said air vents comprise portions of the weave in which the fill yarns overlay the warp yarns in said textile fabric.

36. The automotive protective device according to claim 35, wherein said woven textile fabric is comprised of warp yarns of about 315D nylon and fill yarns of about 210D nylon.

37. The automotive protective device according to claim 35, wherein said woven textile fabric is comprised of warp yarns of about 420D nylon and fill yarns of about 315D nylon.

38. The automotive protective device according to claim 35, wherein said woven textile fabric is comprised of warp yarns of from about 315D to about 420D nylon and fill yarns of from about 195D to about 380D aramid.

39. The automotive protective device according to claim 35, wherein said woven textile fabric is comprised of warp yarns of from about 210D to about 315D nylon and fill yarns of about 210D nylon.

40. The automotive protective device according to claim 10, wherein said woven textile fabric is comprised of warp yarns of from about 315D to about 420D nylon and fill yarns of from about 195D to about 380D aramid.

\* \* \* \* \*